(12) United States Patent
Dam et al.

(10) Patent No.: US 10,634,638 B2
(45) Date of Patent: Apr. 28, 2020

(54) SOLID STATE ELECTROLYTE

(71) Applicant: Stichting IMEC Nederland, Eindhoven (NL)

(72) Inventors: Van Anh Dam, Eindhoven (NL); Daan Wouters, Geldrop (NL); Alexander Farrell, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 52 days.

(21) Appl. No.: 15/633,896

(22) Filed: Jun. 27, 2017

(65) Prior Publication Data

US 2018/0003667 A1 Jan. 4, 2018

(30) Foreign Application Priority Data

Jun. 29, 2016 (EP) ..................... 16176794

(51) Int. Cl.
| | |
|---|---|
| *G01N 27/333* | (2006.01) |
| *B29C 39/00* | (2006.01) |
| *B41M 1/12* | (2006.01) |
| *G01N 27/416* | (2006.01) |

(Continued)

(52) U.S. Cl.
CPC ......... *G01N 27/333* (2013.01); *B29C 39/003* (2013.01); *B41M 1/12* (2013.01); *G01N 27/3335* (2013.01); *G01N 27/4161* (2013.01); *B29K 2027/06* (2013.01); *G01N 27/301* (2013.01)

(58) Field of Classification Search
CPC ............. G01N 27/333; G01N 27/3335; G01N 27/4161; G01N 27/301; B23C 39/009; B41M 1/12; B29K 2027/06
See application file for complete search history.

(56) References Cited

U.S. PATENT DOCUMENTS

| | | | |
|---|---|---|---|
| 4,112,352 A | 9/1978 | Barben, II | |
| 4,214,968 A * | 7/1980 | Battaglia | ............ G01N 27/3335 204/418 |

(Continued)

FOREIGN PATENT DOCUMENTS

KR 20020026047 A 4/2002

OTHER PUBLICATIONS

Kisiel et al (Analyst, 2005, 130, 1655-1662) (Year: 2005).*

(Continued)

*Primary Examiner* — Louis J Rufo
(74) *Attorney, Agent, or Firm* — McDonnell Boehnen Hulbert & Berghoff LLP (57) ABSTRACT

A solid state electrolyte and method of preparation is provided. The solid state electrolyte includes a plasticized polymer matrix with non-dissolved salt crystals embedded in the polymer matrix and wherein the non-dissolved crystals are suitable for dissolving ions in the plasticized polymer. The method of preparation includes dissolving a plasticizer and a polymer matrix in an organic solvent to obtain a plasticized polymer matrix; and mixing the salt crystals with the plasticized polymer matrix, wherein the weight ratio of salt crystals versus plasticizer and polymer matrix and organic solvent is above saturation concentration such that non-dissolved salt crystals are embedded in the plasticized polymer matrix.

13 Claims, 3 Drawing Sheets

(51) Int. Cl.
*G01N 27/30* (2006.01)
*B29K 27/06* (2006.01)

(56) References Cited

U.S. PATENT DOCUMENTS

| | | | |
|---|---|---|---|
| 4,814,060 A * | 3/1989 | Banks | G01N 27/3335 |
| | | | 204/406 |
| 4,925,544 A | 5/1990 | Goldring | |
| 5,385,679 A * | 1/1995 | Uy | A61B 5/04087 |
| | | | 252/500 |
| 5,609,974 A | 3/1997 | Sun | |
| 6,214,251 B1 | 8/2001 | Wu et al. | |
| 7,226,549 B2 | 6/2007 | Gerald, II et al. | |
| 8,648,396 B2 | 2/2014 | Huang et al. | |
| 2009/0166198 A1 * | 7/2009 | Du | G01N 27/301 |
| | | | 204/416 |

OTHER PUBLICATIONS

Michalska et al (Electroanalysis 2012, 24, No. 6, 1253-1265). (Year: 2012).*
European Search Report, European Patent Application No. 16176794.2, dated Jan. 5, 2017, 13 pages.
Florjanczyk, Zbigniew et al., "Polymer-in-Salt Electrolytes Based on Acrylonitrile/Butyl Acrylate Copolymers and Lithium Salts", J. Phys. Chem., vol. 108, 2004, pp. 14907-14914.
Simonis, Anette et al., "Miniaturised Reference Electrodes for Field-Effect Sensors Compatible to Silicon Chip Technology", Electrochimica Acta, vol. 51, 2005, pp. 930-937.

* cited by examiner

SOLID STATE ELECTROLYTE

CROSS-REFERENCE TO RELATED APPLICATIONS

The present application is a non-provisional patent application claiming priority to EP16176794.2, filed Jun. 29, 2016, the contents of which are hereby incorporated by reference.

FIELD OF THE DISCLOSURE

The present disclosure relates to the field of solid state electrolytes. More specifically it relates to solid state electrolytes for electrochemical sensors.

BACKGROUND

Potentiometric sensors are used for detecting chemical or biochemical compounds in a solution. Such potentiometric sensors are electrochemical sensors that generate voltages that scale with the concentration of an ion to be determined. A pH sensor is an example of such a potentiometric sensor. A potentiometric sensor usually comprises an ion-selective electrode and a reference electrode. The reference electrode has a potential which can be used as a reference potential for the ion-selective electrode. The potential difference between the ion-selective electrode and the reference electrode is a measure for the concentration of the compound for which the ion-selective electrode is sensitive. An important requirement is that the potential of the reference electrode is stable and constant.

In amperometric sensors, the sensing electrode is biased at a fixed potential versus the reference electrode. At this potential, ions or molecules of interest are reduced or oxidized at the sensing electrode. By measuring the reducing or oxidizing current at the sensing electrode, the concentration of ions or molecules of interest can be determined. Also here, the stability of the reference electrode potential is crucial for the sensitivity of the sensor.

In operation, the reference electrode is immersed, together with the ion-selective electrode, in the solution under test. For proper operation, the interfacial potential of the reference electrode should be independent of the solution composition.

Figure 1:
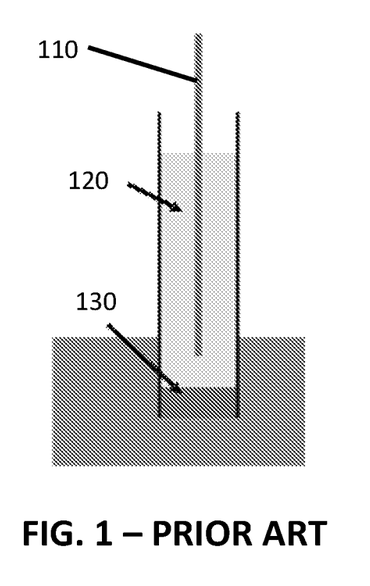
FIG. 1 shows a conventional reference electrode.

A commonly used type of reference electrode is a silver chloride electrode (Ag/AgCl). This electrode has a fixed potential when in contact with a reservoir with a fixed chloride concentration (e.g. 3 Molar KCl). An example of such conventional reference electrode is shown in FIG. 1. FIG. 1 shows a conventional reference electrode comprising an Ag/AgCl wire 110, immersed in a reservoir 120 containing a predetermined chloride concentration, for instance 3 Molar KCl (the reference electrolyte solution). An electrolyte bridge or a porous ceramic plug separates the reference electrolyte solution from the solution which needs to be measured. In the exemplary reference electrode of FIG. 1 the electrolyte bridge is a porous frit (salt bridge) 130 separating the inner reservoir 120 from the bulk solution. Ions can still pass through this junction; therefore an ionic contact forms. Ion selective electrodes also use an internal electrolyte. In that case, instead of a frit, an ion selective membrane separates the internal electrolyte from the solution which needs to be measured. The potential of the Ag/AgCl electrode depends on the chloride concentration in the reference electrolyte solution. The electrolyte bridge or the porous ceramic plug 130 prevents that chloride ions instantaneously migrate between the liquid of the reference electrode and the bulk solution. If the reference electrode is immersed in a solution with different chloride concentration, chloride ions will leach through the electrolyte bridge. Depending on the volume of the reference electrolyte solution these migrations will cause the chloride concentration in the reference electrolyte solution to change, thereby changing the reference voltage (drift). As the reservoir is rather large in the example of FIG. 1, drift is limited. One way of stabilizing the reference voltage is to increase the volume of the reference electrolyte solution. This is, however, not possible in microfabricated reference electrodes since the size is, per definition, limited in these electrodes.

Microfabricated reference electrodes typically comprise a planar electrode, made by photolithography or screen-printing techniques covered by a hydrogel such as agarose or polyhydroxyethylmethacrylate (e.g. Simonis et. al. "Miniaturized reference electrodes for field-effect sensors compatible to silicon chip technology", *Electrochimica Acta* 51, Volume 51, issue 5, 10 Nov. 2005, pages 930-937).

Increasing the stability of miniaturized reference electrodes can be done without increasing the volume of the reference electrolyte solution. Many studies on miniaturized reference electrodes have focused on the composition of the reference electrolyte solution (e.g. a hydrogel), and covering it with membranes to slow down the out diffusion of chloride ions. Besides these efforts there is still room for improving the stability of miniaturized reference electrodes.

SUMMARY

It is an object of embodiments of the present disclosure to provide an improved solid state electrolyte.

The above objective is accomplished by a method and device according to the present disclosure.

In a first aspect, some embodiments of the present disclosure relate to a solid state electrolyte, comprising a plasticized polymer matrix with non-dissolved salt crystals embedded in the polymer matrix and wherein the non-dissolved crystals are suitable for dissolving ions in the plasticized polymer.

In some embodiments of the present disclosure, the non-dissolved crystals are suitable for dissolving ions in the plasticized polymer. These non-dissolved crystals can form a continuous source of ions as they are not dissolved yet. Thus a stable ion concentration in the solid state electrolyte can be maintained and this even if ions are diffusing out of the solid state electrolyte. Indeed, the non-dissolved crystals can form a buffer that replaces ions which are lost to the sample solution by diffusion. If this buffer (the non-dissolved crystals) would not be present, the ion concentration could start to decrease from the moment the ions diffuse out of the electrolyte. Because of the presence of this buffer of non-dissolved crystals, an extra coating preventing the diffusion of the ions may not be necessarily required. No extra coating being present implies a shorter stabilization time because of an increased mobility of the dissolved ions. In some embodiments of the present disclosure, the polymer can be a plasticized polymer. The advantageous effect of the plasticizer can be a shorter stabilization time of the solid state electrolyte because of an increased mobility of the dissolved ions. The stabilization time of a reference electrode comprising a solid state electrolyte, in accordance with some embodiments of the present disclosure, can be shorter than the stabilization time of a conventional reference electrode. This can be particularly useful in applications where a shorter stabilization time/response time is desired, such as a home care application where a user for instance tests his or her own urine sample, or such as an application where a user wants to test the soil quality in the garden. By combining an ion selective electrode with a reference electrode comprising a solid state electrolyte, in accordance with some embodiments of the present disclosure, a potentiometric sensor can be made. In such a sensor, the concentration of ions or molecules of interest can be determined by measuring the potential of the ion selective electrode versus the reference electrode. In some embodiments of the present disclosure, the stabilization time of the reference electrode can be shorter than or equal to the response time of the ion selective electrode. This may be in the order of seconds. A plasticized polymer matrix moreover can be a more stable polymer matrix which breaks less easily. In some embodiments of the present disclosure, the solid state electrolyte can be used as an internal electrolyte of a reference electrode or of an ion selective electrode which provides an improved softness and adhesion to other components of the reference electrode or ion selective electrode. Thus an enhanced mechanical stability of the electrodes can be obtained.

In some embodiments of the present disclosure, the weight ratio of non-dissolved salt crystals versus plasticized polymer matrix may be 7 to 1 or larger.

In some embodiments of the present disclosure, the ion reservoir (the non-dissolved salt crystals) can be increased by increasing the ratio of non-dissolved salt crystals versus plasticized polymer. In some embodiments of the present disclosure, the weight ratio of non-dissolved salt crystals versus plasticized polymer can be 7:1. In case of KCl salt crystals, this corresponds with a weight percentage of about 87.5% of KCl. In some embodiments of the present disclosure, increasing the concentration of the non-dissolved crystals can increase the lifetime of the solid state electrolyte (i.e. the period during which the ion concentration in the solid state electrolyte remains stable). The non-dissolved crystals can serve as a buffer that replenishes the ions in the polymer matrix, thus maintaining a stable ion concentration in the polymer. Thus, increased amount of non-dissolved crystals can result in a longer lifetime of the reference electrode.

In some embodiments of the present disclosure, the solid state electrolyte may comprise an ionophore distributed in the solid state electrolyte.

In some embodiments of the present disclosure, a solid state electrolyte comprising an ionophore can be used to fabricate an electrode which is ion selective. Thus, no additional layers may be required to make the solid state electrolyte ion selective.

In a second aspect, some embodiments of the present disclosure relate to a solid state electrode comprising a solid state electrolyte according to some embodiments of the first aspect of the present disclosure, and an electrode in contact with the solid state electrolyte, wherein the electrode material is such that the ions dissolved by the salt crystals can induce a voltage on the electrode.

In some embodiments of the present disclosure, a stable ion concentration can be maintained in the solid state electrolyte. That is, the potential of the solid state electrode can be maintained at a certain level. Such a solid state electrode may be used as reference electrode. Solid state electrodes according to some embodiments of the present disclosure can be used for health patches or microfluidic systems. An advantage of the solid state electrodes may be their reduced size compared to state of the art electrodes. The solid state electrolyte according to some embodiments of the present disclosure can provide for a reduced size of the solid state electrode while at the same time maintaining the stability of the ion concentration. In some embodiments of the present disclosure the volume of the solid state electrolyte may be less than 4.2 µL or even less than 0.11 µL.

In some embodiments of the present disclosure, the solid state electrode may comprise a coating layer at least partly covering the solid state electrolyte.

In some embodiments of the present disclosure, adding a coating layer on top of the solid state electrolyte can increase the stability of the concentration of the ions in the solid state electrolyte. In the case where the solid state electrode is a reference electrode, this concentration stability may determine the life time of the reference electrode. That is, the lifetime of a reference electrode can be improved and a low drift can be achieved (e.g. when the coating layer is at least partly or even completely covering the solid state electrolyte). In some embodiments of the present disclosure, the material of the solid state electrolyte and the material of the coating can be selected such that they are compatible with each other. This can result in a good adhesion between the coating and the solid state electrolyte.

In some embodiments of the present disclosure, the solid state electrode comprises a solid state electrolyte or a coating layer which can be ion selective.

In some embodiments of the present disclosure, the solid state electrode can be an ion selective electrode by selecting an ion selective coating or a solid state electrolyte that is ion selective (e.g. by adding an ionophore to the solid state electrolyte). Ion selective electrodes according to some embodiments of the present disclosure can be applied for analyzing ions in all above-mentioned applications.

In a third aspect, some embodiments of the present disclosure relate to a method for making a solid state electrolyte, the method comprising:
(a) dissolving a plasticizer and a polymer matrix in an organic solvent to obtain a plasticized polymer matrix; and
(b) mixing salt crystals with the plasticized polymer matrix, wherein the weight ratio of salt crystals versus plasticizer and polymer matrix and organic solvent is above the saturation concentration such that non-dissolved salt crystals are embedded in the plasticized polymer matrix.

In some embodiments of the present disclosure, non-dissolved crystals in a polymer matrix can be obtained which in turn increases the concentration of the non-dissolved crystals. These non-dissolved crystals form a buffer that replenishes ions in the polymer matrix. In some embodiments of the present disclosure, the solvent can evaporate after making the solid state electrolyte.

In some embodiments of the present disclosure, the method for making a solid state electrolyte may comprise a step of drop casting the solid state electrolyte on an electrode.

The solid state electrolyte on top of the electrode can have an increased thickness by drop casting the solid state electrolyte on the electrode. When drop casting, a thickness above 200 µm or even above 300 µm can be obtained.

In some embodiments of the present disclosure, the method for making a solid state electrolyte may comprise a step of screen printing the solid state electrolyte on a reference electrode.

This can provide for fabrication of reference electrodes in high or medium volume production by screen-printing or drop casting (e.g. using dispense system) techniques.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" or "some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various disclosed aspects. This method of disclosure, however, is not to be interpreted as reflecting an intention that the claimed disclosure requires more features than are expressly recited in each claim. Rather, as the following claims reflect, disclosed aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Figure 5:
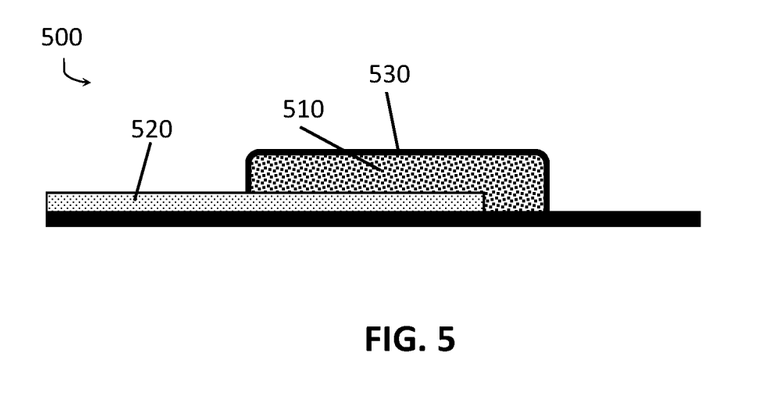
FIG. 5 shows a schematic cross-sectional drawing of a solid state electrode in accordance with some embodiments of the present disclosure.

In a first aspect, the present disclosure provides a solid state electrolyte 510. The solid state electrolyte comprises a plasticized polymer matrix. Non-dissolved crystals can be embedded in the polymer matrix. These non-dissolved crystals can be suitable for dissolving ions in the plasticized polymer. As such, a stable ion concentration can be maintained in the plasticized polymer matrix. The solid state electrolyte, according to some embodiments of the present disclosure, can contain an excess amount of ions (e.g. chloride ions) because of the presence of the non-dissolved salt crystals. Thus the solid state electrolyte may be able to maintain a constant ion concentration (e.g. chloride ion concentration) inside the solid state electrolyte even when the leaching out of the ions already starts. The excess of salt crystals can serve as a buffer that replenishes ions (e.g. chloride ions) in the film, thus maintaining a stable ion (e.g. chloride) concentration.

When a solid state electrolyte, according to some embodiments of the present disclosure, is submerged in water, the ion concentration near the electrode can remain stable over a period of more than 13 hours, or even over a period of more than 27 hours. A stable concentration thereby can mean that the ion concentration changes can result in a voltage change less than 0.6 mV or even less than 0.3 mV or even less than 0.17 mV when the solid state electrolyte is submerged in water.

In some embodiments of the present disclosure, the plasticized polymer matrix can be plasticized PVC (polyvinyl chloride). The plasticizer can, for example, be Bis(2-ethylhexyl) sebacate. In embodiments of the present disclosure, the salt crystals can be solid chloride salt crystals (such as KCl). In some embodiments of the present disclosure, the polymer can be any polymer except for water soluble polymers.

In some embodiments of the present disclosure, the ratio of non-dissolved salt crystals (e.g. chloride salt) to the plasticized polymer matrix (e.g. mixture of PVC and plasticizer) can be 7:1 (by weight) and higher. The upper limit of the weight ratio can be determined by the minimum concentration of plasticized polymer matrix required to maintain a closed film (i.e. to prevent the formation of open channels). The closed film can have an advantage in that the diffusion out of the solid state electrolyte can be limited by the closed film. In some embodiments of the present disclosure, the salt-crystals form chunks inside the plasticized polymer matrix which can dissolve and maintain the ion concentration.

In some embodiments of the present disclosure, the solid state electrolyte comprises an ionophore distributed in the solid state electrolyte. Such ionophores may, for example, be without being limited thereto, valinomycin, potassium ionophores, sodium ionophores, calcium ionophores, nitrate ionophores, or sulphate ionophores. This makes the solid state electrolyte suitable for use in an ion selective electrode.

In a second aspect, the present disclosure provides a solid state electrode 500. In such solid state electrodes 500, a solid state electrolyte 510 according to some embodiments of the present disclosure can be in contact with an electrode 520. The solid state electrode may, for example, be a reference electrode or an ion selective electrode. The reference electrode comprises an electrode and a solid state electrolyte wherein the electrode is in contact with the electrolyte. Depending on the electrode material, a corresponding salt should be used such that the ions dissolved by the salt crystals can induce a voltage on the electrode. Without being limited thereto, an example thereof may be Ag or AgCl electrode combined with chloride salt crystals as corresponding salt. Another possible combination is the combination of a silver or silver halide (compounds which are formed between silver and one of the halogens, e.g. AgX) electrode with a salt crystal of these halogens. Another possible combination is the combination of a noble metal (Au, Pt, Pd . . . ) electrode and quinhydrone crystals. Such a reference electrode may, for example, be used in electrochemical sensor systems for controlling food quality, water quality, pollution monitoring etc., as well as in wearable patch devices or microfluidic systems for analyzing ions in bodily fluids such as sweat, urine etc.

In embodiments of the present disclosure, the electrode is an Ag/AgCl electrode. In that case, the non-dissolved salt crystals may be composed of KCl such that they can dissolve chloride ions in the plasticized polymer and thus maintain a stable ion concentration in the solid state electrolyte. The amount of KCl used may, for example, be about 15 mg KCl per Ag/AgCl electrode.

Solid state electrodes, according to some embodiments of the present disclosure, may be at least partly covered with a coating on top of the solid state electrolyte. A schematic cross-sectional drawing of such a solid state electrode 500 is shown in FIG. 5. It shows an electrode 520 with on top of part of the electrode a solid state electrolyte 510. This solid state electrolyte can be covered with a coating 530.

In ion selective electrodes according to some embodiments of the present disclosure, the coating 530 can be a selective membrane for specific ions. In some embodiments of the present disclosure, the solid state electrolyte can be made from the same polymer and organic solvent, which are used for the coating (e.g. ion selective membrane), and ionophore. Therefore, in some embodiments of the present disclosure, the plasticized polymer matrix can be compatible with the coating, thus adhering better to the coating (e.g. the ion selective membrane in the ion selective sensors).

In some embodiments of the present disclosure, the solid state electrolyte can be applied as a layer and can be the solid state internal electrolyte of a reference electrode or of an ion selective electrode.

In a third aspect, the present disclosure provides a method for producing a solid state electrolyte. According to some embodiments of the present disclosure, the method can involve directly mixing a large amount of salt (e.g. chloride salt), the amount being sufficiently large such that salt crystals are obtained, with a polymer matrix (such as PVC) and a plasticizer (such as Bis(2-ethylhexyl) sebacate (DOS), which can be dissolved beforehand in an organic solvent (such as cyclohexanone). The weight ratio of salt, e.g. chloride salt, to polymer matrix+ plasticizer, e.g. PVC+ plasticizer, may be 7:1 and higher. Since the salt (e.g. KCl) can be poorly soluble in the plasticized polymer matrix (e.g. PVC), the salt can be present in the plasticized polymer matrix as non-dissolved crystals that are embedded within the polymer matrix.

This mixture may be deposited on an electrode such as an Ag/AgCl electrode, and may serve as the solid state internal electrolyte for a reference electrode or for an ion selective electrode. Depositing may, for example, be done by drop casting or by screen printing.

The dissolved ions (e.g. the chloride ions) can only diffuse out of the solid state electrolyte through the plasticized polymer matrix. By increasing the thickness of the solid state plasticized polymer matrix and the concentration of the plasticized polymer in the organic solvent, the diffusion/leaching out of the ions (e.g. chloride ions) can be advantageously minimized. Thus when a reference electrode includes such a solid state electrolyte as a reference electrolyte, the stability of the reference electrode potential can be improved.

When, in case of a reference electrode according to some embodiments of the present disclosure, an electrode is in contact with the solid state electrolyte, this can keep the potential of the reference electrode stable at a level defined by the saturated ion (e.g. chloride ion) concentration even when ions (e.g. KCl) starts to leach out from the polymer layer. Having a large excess of salt can improve the life time of the reference electrode.

Figure 2:
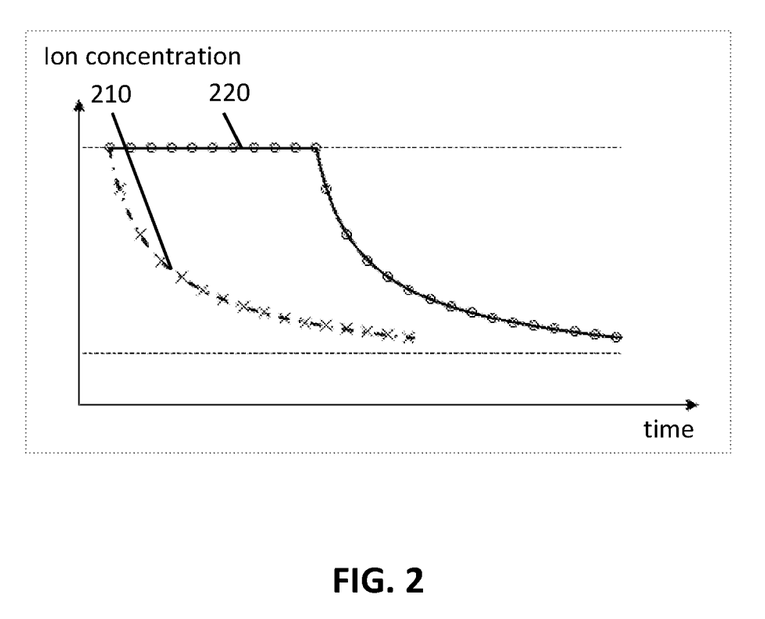
FIG. 2 shows the ion concentration in function of time for a solid state electrolyte according to the present disclosure and for a conventional electrolyte which are both submerged in water.

FIG. 2 schematically illustrates the evolution of the ion concentration in an electrolyte in function of time when the electrolyte is submerged in water. Curve 210 shows the ion concentration for a conventional electrode and curve 220 shows the ion concentration for an electrode comprising a solid state electrolyte in accordance with embodiments of the present disclosure. Both electrolyte layers start at time 0 with a saturated concentration of KCl. Upon contact with water (sample), both electrodes start losing KCl to the environment. In some embodiments of the present disclosure, the solid state electrolyte can be oversaturated (excess amount of KCl), thus an 'incubation period' can be introduced to keep the concentration of Cl ions close to the metal electrode stable for a longer time (in the example a metal electrode is covered by the solid state electrolyte) and thus increasing the functional life-time of the device. Both curves 210, 220 start at the same initial concentration level. Curve 210 drops immediately towards the ion concentration level of the environment whereas curve 220 first remains stable before it starts decreasing towards the ion concentration level of the environment.

Figure 3:
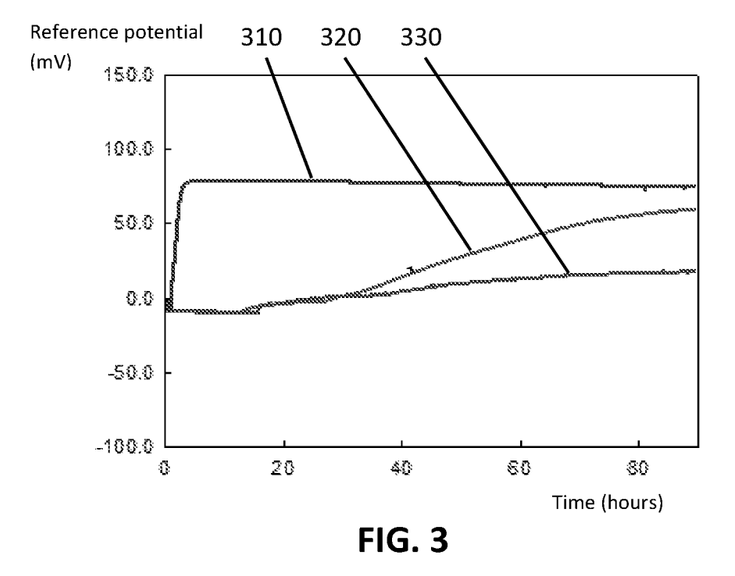
FIG. 3 shows the reference voltage of three reference electrodes in accordance with some embodiments of the present disclosure: a first one comprising a solid state electrolyte, a second one with an even thicker solid state electrolyte and a third one wherein the solid state electrolyte is covered with a coating.

FIG. 3 presents the result of a stability test of reference electrodes in accordance with representative embodiments of the present disclosure. The curves show the reference potential in function of time. The reference potential is expressed in mV and the time scale is in hours. Curve 310 is the measured stability of a reference electrode of which the electrode is covered by a layer of solid state electrolyte. Curve 320 corresponds with a similar reference electrode but with a solid state electrolyte with an increased thickness. The thickness of such a layer of solid state electrolyte may for example vary between 300 µm and 600 µm. For curve 330 the corresponding reference electrode has a layer with the same thickness as the layer of the reference electrode corresponding with curve 320. Additionally the solid state electrolyte layer of the reference electrode corresponding with curve 330 has an extra coating. The curves are obtained by measuring the reference potential when constantly immersing the reference electrodes in 0.1 M KCl solution while the potential of the tested reference electrodes was recorded as a function of time versus a commercial reference electrode.

In this example, the solid state internal electrolyte layer was made from a PVC, DOS, KCl and cyclohexanone mixture (ratio of KCl to PVC and DOS~7:1), which was drop casted on a screen printed AgCl electrode. When drop casting, a thickness of the solid state electrolyte above 600 µm can be obtained.

FIG. 3 shows that the stability time of the reference electrode increases with the thickness of the solid state internal electrolyte layer. The reference electrode with the thick solid state internal electrolyte layer shows a stable potential 320 of −9.1±0.6 mV in the first 13 hours. In the first 27 hours of testing, this reference electrode shows a drift of 0.3 mV/hour.

Curve 330 corresponds with a solid state internal electrolyte which is coated with an extra PVC coating layer, which is fully compatible with the solid state internal electrolyte. With this coating layer, the potential 330 of the reference electrode can be kept stable even longer and drift is reduced below 0.29 mV/hour.

Figure 4:
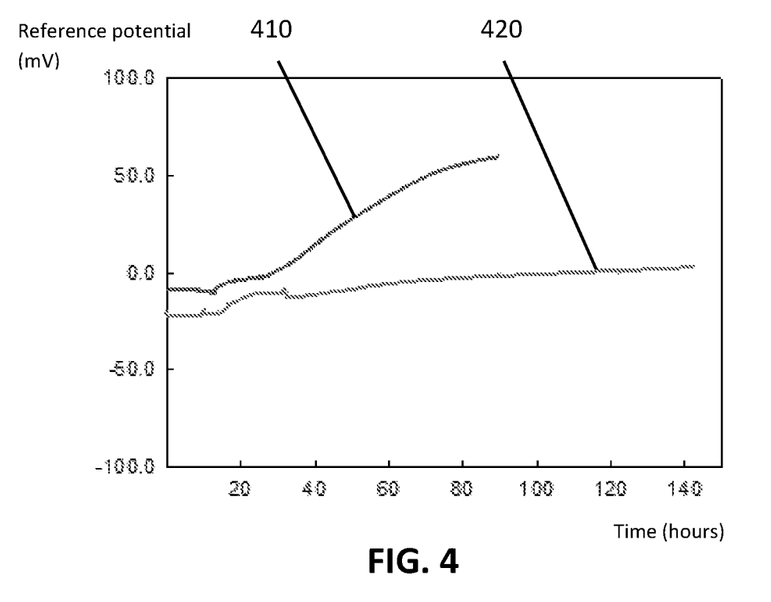
FIG. 4 shows the drift of two different electrodes each with a different solid state electrolyte, both in accordance with some embodiments of the present disclosure. The figure shows that the lifetime and drift of the reference electrode can be improved by increasing the plasticized polymer concentration in the mixture.

FIG. 4 shows the drift in function of time for two reference electrodes in accordance with particular embodiments of the present disclosure. The reference potential is expressed in mV and the time scale is in hours. The reference electrodes comprise a solid state electrolyte in accordance with particular embodiments of the present disclosure. The solid state internal electrolyte layer has a thickness comparable to the thickness of the solid state internal electrolyte layer of the reference electrodes corresponding with curves 320, 330. In this example, the plasticized polymer matrix is a PVC matrix and the salt is a chloride salt. The weight ratio of chloride salt to the PVC+plasticizer is 7:1. In some embodiments of the present disclosure, even without an extra coating on the solid state internal electrolyte, the lifetime of the reference electrode can be improved. This is illustrated in FIG. 4, showing the drift for two different reference electrodes: a first electrode corresponding with curve 410 and a second electrode corresponding with curve 420. In some embodiments of the present disclosure, the lifetime of the reference electrode can be improved by using a different solid state internal electrolyte. In some embodiments of the present disclosure, the lifetime can be improved by increasing the plasticized polymer concentration in the mixture for preparing the solid state electrolyte. The solid state internal electrolyte layer of these reference electrodes was made from PVC, DOS, KCl and cyclohexanone mixture (ratio of KCl to PVC and DOS~7:1). The PVC:Cyclohexanone ratio was 1:28 for the first reference electrode and 1:14 for the second reference electrode. The second reference electrode shows a drift of only 0.17 mV/hour.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. A solid state electrode comprising:
   a solid state electrolyte comprising a plasticized polymer matrix with non-dissolved KCl salt crystals embedded in the polymer matrix, wherein the weight ratio of non-dissolved KCl salt crystals versus plasticized polymer matrix is 7 to 1 and wherein the non-dissolved salt crystals are suitable for dissolving ions in the plasticized polymer; and
   an electrode in contact with the solid state electrolyte, wherein the electrode comprises a material is such that the ions dissolved by the salt crystals induce a voltage on the electrode.

2. The solid state electrode according to claim 1, wherein the solid state electrolyte further comprises an ionophore distributed in the solid state electrolyte.

3. The solid state electrode according to claim 2, wherein the coating layer is ion selective.

4. The solid state electrode according to claim 1, the solid state electrode further comprises a coating layer at least partly covering the solid state electrolyte.

5. The solid state electrode according to claim 1, wherein the electrode in contact with the solid state electrolyte is an Ag/AgCl electrode.

6. An electrochemical sensor comprising a solid state electrode of claim 1.

7. A method for making a solid state electrode, the method comprising:
 (a) dissolving a plasticizer and a polymer matrix in an organic solvent to obtain a plasticized polymer matrix;
 (b) mixing salt crystals with the plasticized polymer matrix to form the solid state electrolyte, wherein the weight ratio of KCl salt crystals versus plasticizer and polymer matrix and organic solvent is above the saturation concentration such that non-dissolved KCl salt crystals are embedded in the plasticized polymer matrix and wherein the weight ratio of the non-dissolved KCl salt crystals versus plasticized polymer matrix is 7 to 1; and
 c) drop casting or screen printing the solid state electrolyte onto an electrode to form the solid state electrode.

8. The method according to claim 7, the method further comprising mixing an ionophore with the plasticized polymer matrix.

9. The method according to claim 8, wherein the ionophore comprises valinomycin, a potassium ionophore, a sodium ionophore, a calcium ionophore, a nitrate ionophore, or a sulphate ionophore.

10. The method according to claim 7, wherein the plasticized polymer matrix comprises plasticized PVC (polyvinyl chloride).

11. The method according to claim 7, wherein the plasticizer comprises bis(2-ethylhexyl) sebacate.

12. The method according to claim 7, wherein the electrode is a reference electrode or an ion selective electrode.

13. The method according to claim 7, wherein the electrode is an Ag/AgCl electrode.

* * * * *